Jan. 25, 1966   L. B. DE LONG ETAL   3,230,721
WALKING WORK BARGE
Filed Nov. 19, 1962   14 Sheets-Sheet 3
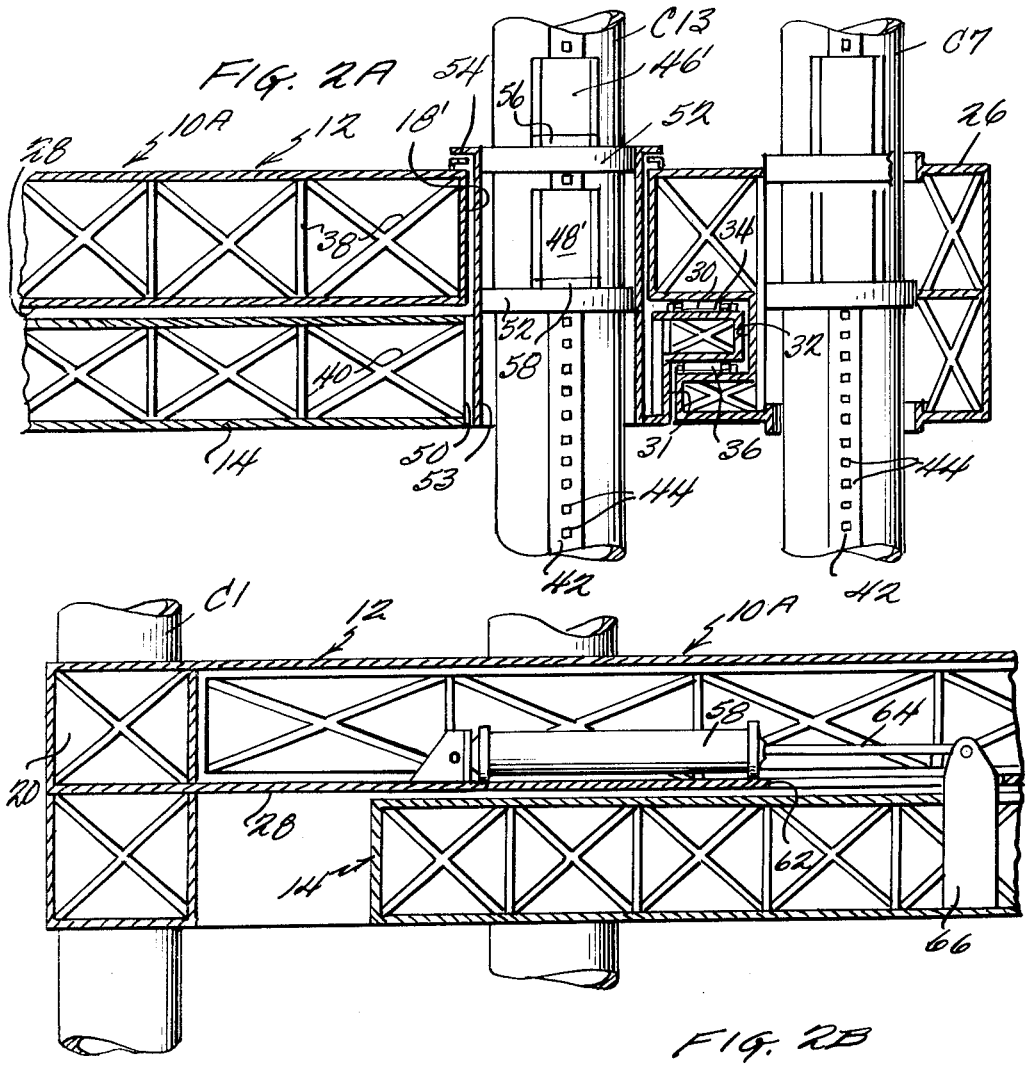
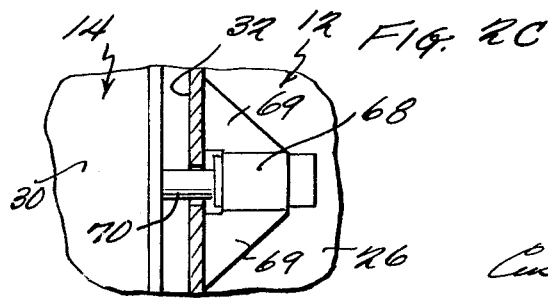
INVENTORS
Leon B. DeLong
Carl B. Finkelson
George E. Suderow, Deceased
By Ethel D. Suderow
 Executrix
BY
Cushman, Darby & Cushman
ATTORNEYS INVENTORS
Leon B. DeLong
Carl B. Finkelson
George E. Suderow, Deceased
By Ethel D. Suderow
Executrix BY Cushman, Darby & Cushman
ATTORNEYS Jan. 25, 1966

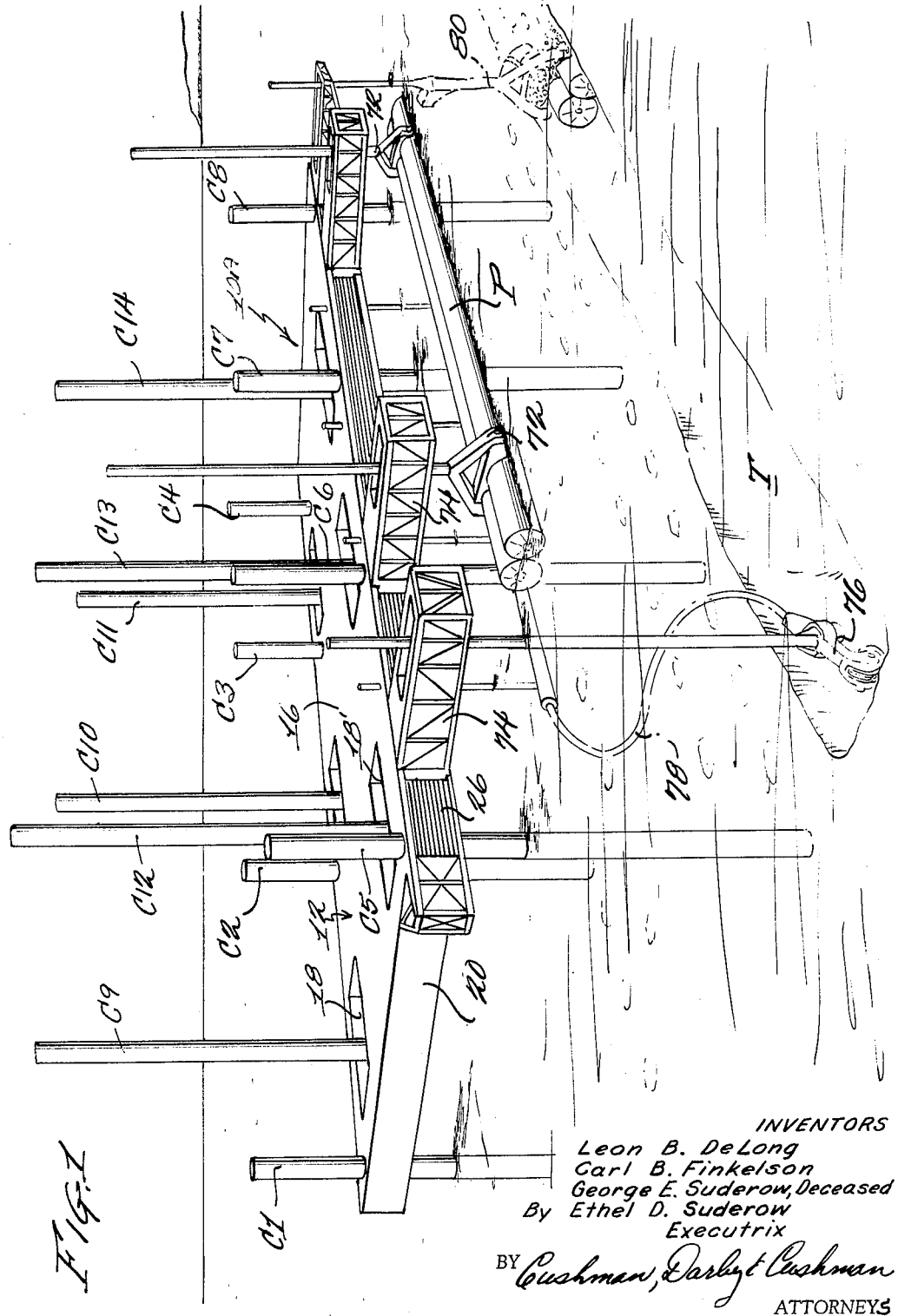

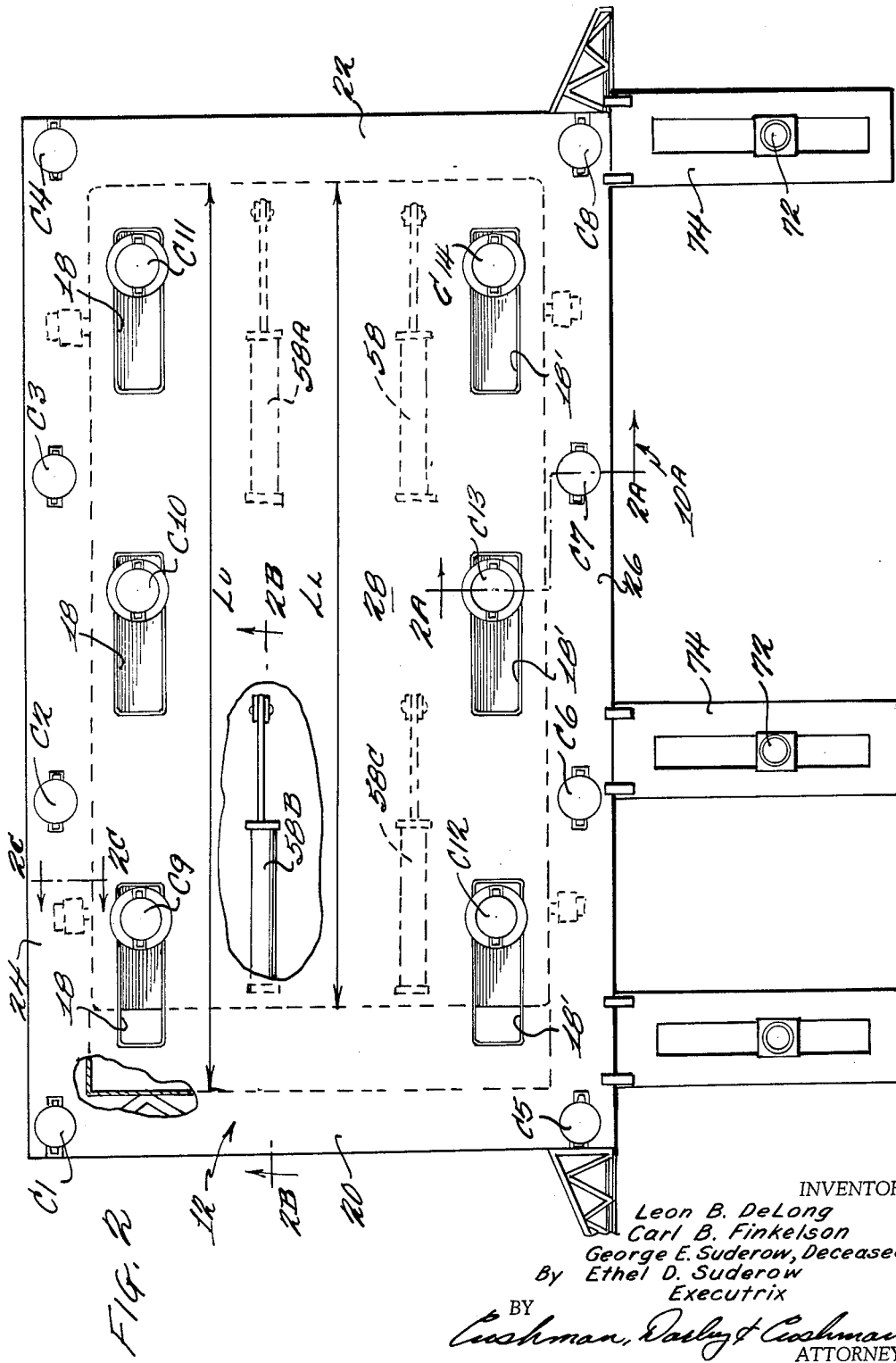

L. B. DE LONG ETAL 3,230,721

WALKING WORK BARGE

Filed Nov. 19, 1962

INVENTORS
Leon B. DeLong
Carl B. Finkelson
George E. Suderow, Deceased
By Ethel D. Suderow
Executrix BY
Cushman, Darby & Cushman
ATTORNEYS Jan. 25, 1966    L. B. DE LONG ETAL    3,230,721
WALKING WORK BARGE Filed Nov. 19, 1962    14 Sheets-Sheet 11

INVENTORS
Leon B. De Long
Carl B. Finkelson
George E. Suderow, Deceased
By Ethel D. Suderow
Executrix BY Cushman, Darby & Cushman
ATTORNEYS Jan. 25, 1966

L. B. DE LONG ETAL 3,230,721

WALKING WORK BARGE

Filed Nov. 19, 1962

INVENTORS
Leon B. DeLong
Carl B. Finkelson
George E. Suderow, Deceased
By Ethel D. Suderow
Executrix BY
Cushman, Darby & Cushman
ATTORNEYS

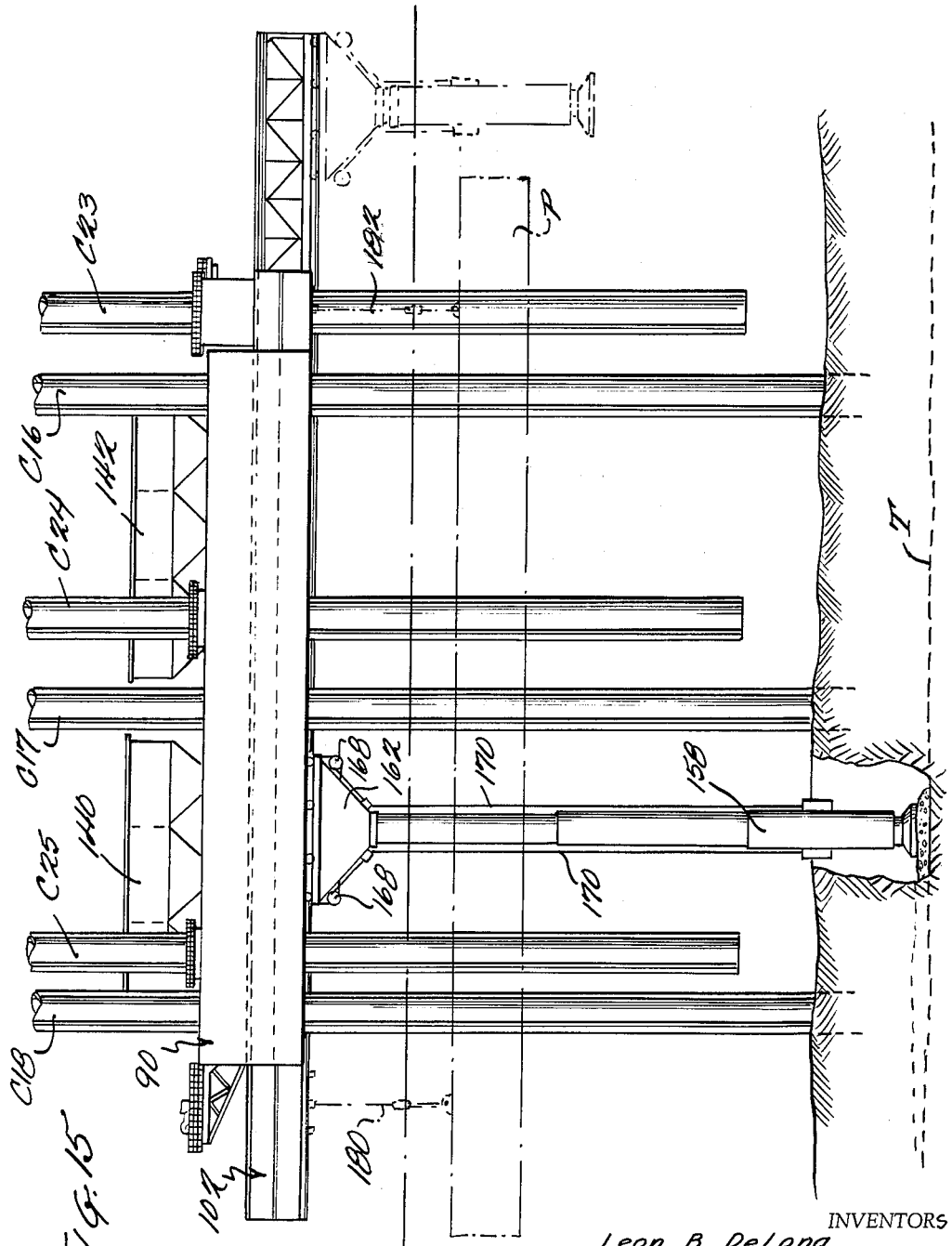

Jan. 25, 1966 L. B. DE LONG ETAL 3,230,721
WALKING WORK BARGE
Filed Nov. 19, 1962 14 Sheets-Sheet 14
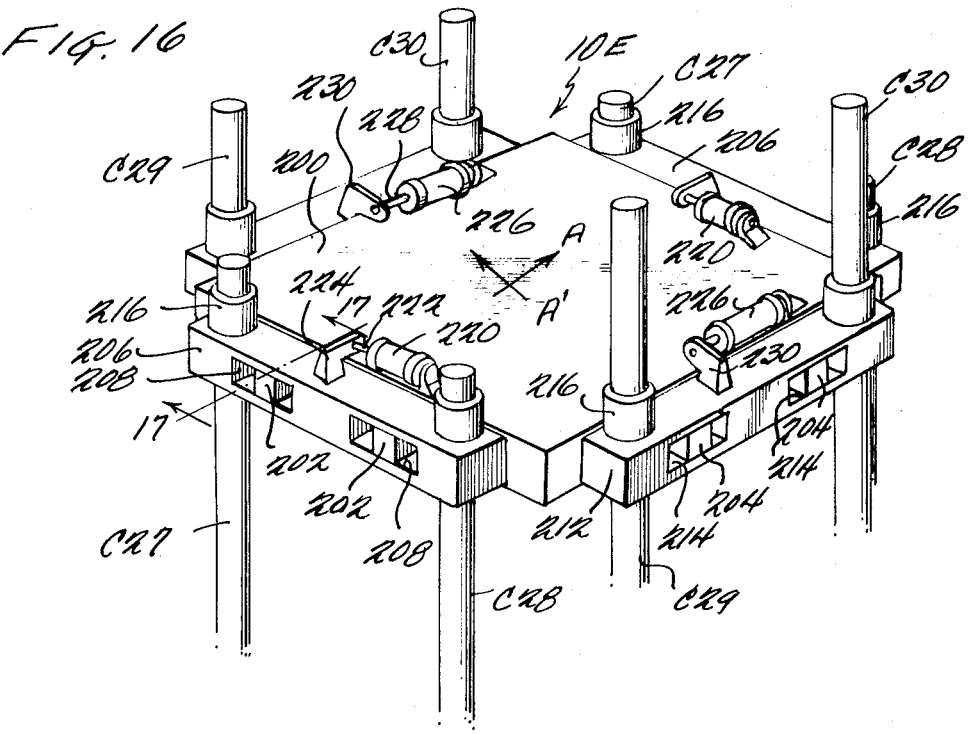
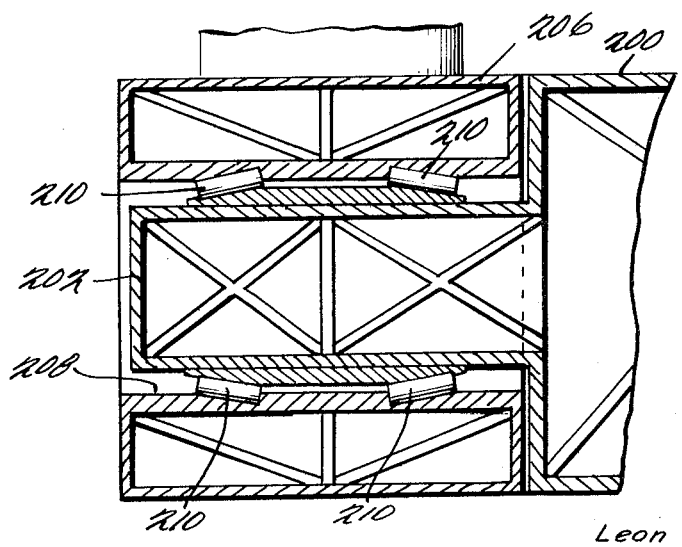
INVENTORS
Leon B. DeLong
Carl B. Finkelson
George E. Suderow, Deceased
By Ethel D. Suderow
Executrix
BY
Cushman, Darby & Cushman
ATTORNEYS ized Jan. 25, 1966

3,230,721
WALKING WORK BARGE

Leon B. De Long, Seattle, Wash., Carl B. Finkelson, Staten Island, N.Y., and George E. Suderow, deceased, late of Staten Island, N.Y., by Ethel D. Suderow, executrix, Staten Island, N.Y., assignors to De Long Corporation, New York, N.Y., a corporation of Delaware
Filed Nov. 19, 1962, Ser. No. 238,803
16 Claims. (Cl. 61—46.5)

This invention has reference to a walking barge operative for marine construction purposes such as laying tunnel pipes and other uses wherein the barge must be movable to a marine work site.

Technical advancements in the field of marine construction in the last half century have rendered possible marine construction projects of a monumental nature. Early developments in the field of marine barges of this character are typified by the early patents to Piercy, Nos. 968,975, 1,127,507, 1,128,039, and 1,128,040. These patents disclose forms of marine staging constructions and the like supported by caissons or legs on the ocean floor. For example, in the Piercy Patent, 968,975, there is shown a walking barge construction including movable caissons, the structure being buoyant by virtue of the pontoons carried thereby.

Moreover, marine construction tasks of large magnitude have been rendered practical by virtue of caisson jacking apparatus which are capable of supporting extremely heavy loads, these jacks being operatively carried by the barge to move the caissons in a vertical direction. Such jacking apparatus are typified by the patents to Pointer, No. 2,775,869, and Suderow, No. 2,932,486, which teachings are included herein by reference.

The present invention contemplates the provision of a new and improved buoyant walking barge which enjoys significant advantages over prior art constructions of this character. According to this invention, the barge construction includes a deck area over its major portion so as to provide a maximum work area consistent with structural requirements for the caisson supporting means.

This invention also contemplates a walking barge including new and improved means for effecting movement of the barge while the same is supported on caissons or other types of legs above sea level or the normal water level. By virtue of the construction according to the instant invention, the barge, being buoyant, may be towed to a work site and thereafter elevated to a position above the sea level and supported by caissons. In this regard, the barge may be formed of two platforms with a set of caissons joined to each of the platforms, each set of caissons being operative to support the entire barge weight. With one set of caissons raised, the other set supports the entire structure. Hydraulic means are provided to move one platform longitudinally relative to the other, and its set of caissons is then lowered for support on the ocean floor. When the barge is to be moved again in a longitudinal direction, the set of caissons which formerly remained stationary is then raised and the relative movement effected between the two platforms, this entire operation taking place above the water line or sea level.

Further objects of the present invention are to provide a walking barge of the character described which is operative to lay tunnel pipes or other submarine structure along a predetermined path, and a new and improved method of walking a barge on a marine ground along transverse axes.

These and still further objects, advantages and novel features of the present invention will become apparent in the specification and claims, taken in connection with the accompanying drawings.

In the drawings

FIGURE 1 is a perspective view of the walking barge construction according to the invention while laying tunnel pipe on the ocean floor;

FIGURE 2 is a plan view of the structure shown in FIGURE 1;

FIGURES 2A, 2B and 2C are sectional views taken along lines 2A—2A, 2B—2B, and 2C—2C, respectively, in FIGURE 2;

FIGURE 15 is a side elevational view of the walking barge in FIGURE 13;

FIGURE 16 is a perspective view of still another embodiment of the walking barge according to this invention; and FIGURE 17 is a sectional view taken along line 17—17 of FIGURE 16.

The walking barge in FIGURES 1–6

Figure 3:
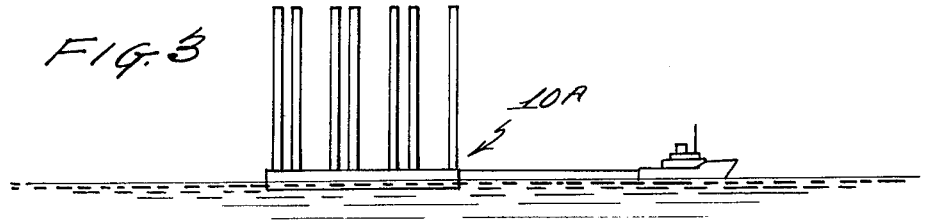
FIGURES 3–6 are diagrammatic elevational views of the walking barge.

Referring first to FIGURES 1, 2, 2A, 2B, and 2C, there is shown a walking barge 10A which includes an upper buoyant platform 12 and a lower buoyant platform 14. The upper platform 12 has a generally continuous deck area 16 and is of rectangular configuration. However, the upper platform 12 has long vertical slots 18 and 18' therethrough which extend longitudinally relative to the deck 16. As best shown in FIGURES 2 and 2A slots 18 are positioned on one side of the deck 16 while the other side of the deck 16 has aligned slots 18'. Generally speaking, the upper platform 12 takes the form of an inverted open box-like structure, having depending peripheral forward and rearward end structures 20 and 22, respectively, and opposed side structures 24 and 26, all of which depend below a continuous rectangular central portion 28. The slots 18 and 18' are thus positioned within the central portion 28 of the upper platform 12.

The lower platform 14 is carried within the central portion 28 of the upper platform 12 and is of a length $L_L$ is less than the length $L_U$ of the central portion 28 so as to be longitudinally movable with respect to the upper platform 12 a distance substantially equal to $L_U - L_L$, or increments of this distance.

Referring now to FIGURE 2A, the connection between the upper platform 12 and the lower platform takes the form of a longitudinal tongue-and-groove joint along the side structures 24 and 26 of the upper platform 12. To this end, the lower platform has a laterally extending lip structure 30 along the upper end of its sides 31 which is received in a cooperatively-shaped lateral recess 32 on the inside of the side structures 24 and 26. The top surface of the lower platform 14 above the lateral lip structure 30 carries longitudinally-spaced roller bearings 34; and also roller bearings 36 are carried between the bottom surface of the lip 30 and the cooperatively facing upper surface in the lateral recess 32. These roller bearings 34 and 36 are so mounted to the lower platform 14 to allow the lower platform 14 to move along the central portion 28 of the upper platform 12 as described, so that friction is reduced as much as possible. Moreover, suitable structural framing 38 is provided in the upper platform 12 and likewise structural framing 40 is provided in the lower platform 14 as necessary to provide a rigid and rugged construction.

In order to support both the upper and lower platforms, two sets of vertically movable legs are provided. In this regard, the upper platform 12 carries legs, shown as caissons C1–C4 along its side structure 24 outwardly of its central portion 28, and caissons C5–C8 are carried in opposed relationship along the opposite side structure 26. These caissons take the form of vertical pipes having long channel-shaped members 42 joined to their front and rear sides, and have a vertically extending series of uniformly-spaced rectangular apertures 44. Mounted in cooperative relationship with the caissons C1–C8 are upper and lower jacking mechanisms 46 and 48, which, in the preferred embodiment of this invention, are of the type disclosed in the patent to Suderow, No. 2,932,486. The jacking mechanisms 46 and 48 are cooperative with the channel members 42, to thereby raise and lower the caissons C1–C8 relative to the upper platform 12. Preferably, the upper jacking mechanisms are carried by the framing in the side structure as best shown in FIGURE 2A. However, it should be appreciated that the particular jacking mechanism is not critical to the invention: alternative jacking mechanisms are well-known in the art for such a purpose.

The lower platform 14 has slotted openings 50 in alignment with the slots 18 and 18'. These vertical openings are defined by cylindrical plates 52 which are rigidly joined to the lower platform 14 via a long vertically extending cylinder 53 which extends upwardly through the slots 18 and 18' and terminate at the upper deck 16 with a lateral flange 54. In this manner, the lower platform 14 carries caissons C9–C11, these caissons extending through the slots 18 and the vertical cylinders 53, while the caissons C12–C14 extend through the slots 18, in a like manner. These caissons C9–C14 carry longitudinally opposed vertical extending channel members 42 with rectangular recesses 44 while the cylindrical plates 52 carry upper and lower opposed jacking mechanisms 46' and 48'. These jacking mechanisms are carried within the cylindrical plates 52 by upper and lower framing members 56 and 58, respectively, joined thereto.

With the caissons C1–C8 lowered to the marine ground and supporting both the upper and lower platforms 12 and 14, the caissons C9–C14 may be raised by their respective jacking mechanisms 46' and 48'; conversely with the caissons C9–C14 supporting the entire barge 10A on the marine ground, the caissons C1–C8 may be raised.

In FIGURE 2B there is shown a hydraulic piston and cylinder arrangement for moving the platforms 12 and 14 longitudinally relative to one another when one set of caissons has been raised while the other set of caissons supports the barge 10A on the marine ground. This arrangement takes the form of a battery of hydraulic cylinders 58, 58a, 58b, 58c (FIGURE 2), although it will be appreciated that the actual number of cylinders utilized depends on design conditions. Each hydraulic cylinder is mounted in a longitudinal direction at the underside of the top platform central portion 28 by suitable structural framing 60. These hydraulic cylinders 58 are thus stationary with respect to the upper platform 12. A longitudinally extending slot 62 is formed in the bottom of the central portion 28 along the axis of the hydraulic cylinder 58 and the piston rod 64 of the cylinder 58 is joined to the upper end of the lower platform 14 (through the slot 62) by way of a bracket connection 66. Thus, the hydraulic cylinder 58 has a stroke which is a maximum of the distance $L_L$–$L_U$ but is preferably an incremental portion thereof.

FIGURE 2C shows an arrangement for insuring proper lateral alignment of the lower platform 14 within its tongue-and-groove recess connection with the upper platform 12. Here shown is a small adjusting cylinder 68 mounted to the vertical side wall of the lateral recess 32 of the side structures 24 and 26 via web plates 69. The cylinder 68 has a piston rod 70 which extends through an appropriate aperture in the side wall and is thereby operative to align the lower platform 14 to insure unobstructed longitudinal movement within the tongue-and-groove recess. Four such adjusting cylinders 68 are shown in FIGURE 2, although it will be appreciated that the actual number can be varied according to design conditions.

The caissons C9–C14 are positioned relative to the vertical slots 18 and 18' so as not to interfere with the stroke length. Thus, for example, when the caissons C1–C8 support the barge 10A on the marine ground and the caissons C9–C14 are raised, the hydraulic cylinders 58 are actuated to move the piston rods 64 within the cylinder 58 so that the lower platform 14 is moved toward the forward end 20 of the upper platform 12. Subsequently, the caissons C9–C14 are lowered for supporting engagement with the ground and the caissons C1–C8 are raised. The hydraulic cylinders 58 are then actuated to move the piston rods 64 out of the cylinders 58 so that the upper platform 12 is moved forward in another step. By virtue of this arrangement, it will be apparent that the barge 10A can be walked on the marine ground while positioned above the sea or water level.

Referring again to FIGURE 1, the barge 10A is shown at a marine working site where large tunnel pipes are being laid. In this regard, the tunnel pipes P may be floated out to the barge 10A with its ends sealed. The pipe P is then grasped by pipe handling members 72 which are mounted for vertical movement on transversely extending, cantilevered members 74 extending from the side wall structure of the upper platform 12. The tunnel pipe P is then lowered to the marine ground by virtue of the jacking arrangement (not shown) where it is aligned with previously laid pipe. The platform 10 also carries a dredging apparatus 76 at its forward end which forms a trench T in the marine ground. This bottom silt is transferred back to the rearward end of the barge 10A via piping 78 where it is transferred onto the previously laid tunnel pipe through a suitable conduit arrangement 80. The pipe handling equipment and the dredging equipment are here disclosed to show the utility of the barge 10A, and any suitable equipment for the dredging and pipe laying operation may be carried by the barge 10A to accommodate this pipe laying operation.

Referring now to FIGURES 3–6 in sequence of using the barge 10A is diagrammatically shown. In FIGURE 3, the barge 10A is being towed at sea by a ship with the caissons C1–C14 all raised to the uppermost position so as to render the barge 10A sufficiently seaworthy to be towed in the water.

Figure 4:
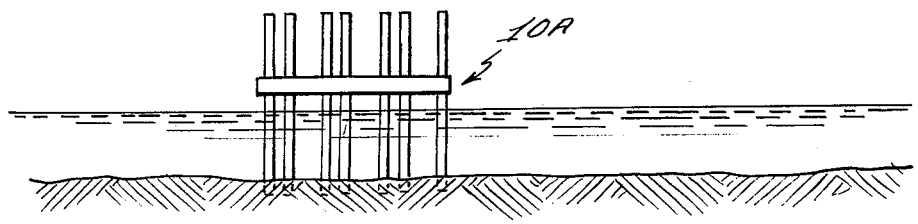
Figure 5:
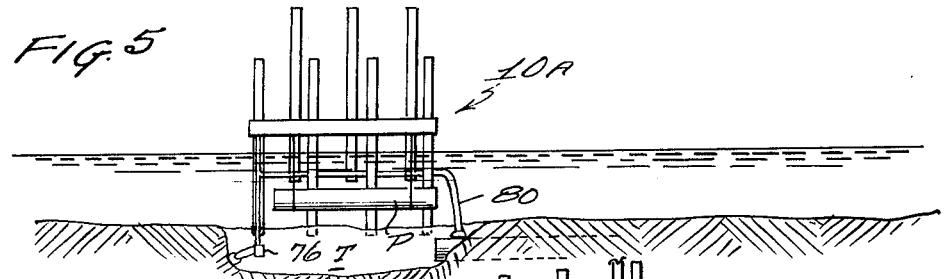

In FIGURE 4, the barge 10A is shown at the working site and the caissons C1–C14 have been lowered. With all the caissons C1–C14 so lowered, the barge 10A is elevated above the water level so as to be free from interference by waves and the general surface conditions of the water. The barge is then ready for the pipe laying operation, as previously described, the barge 10A being walked along the marine ground while the platforms are above sea level.

Figure 6:
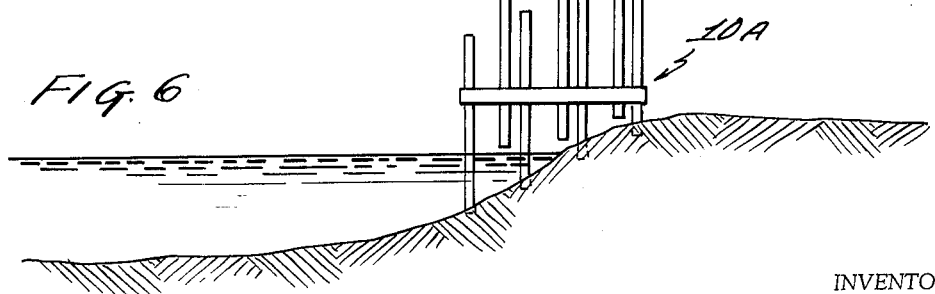

In FIGURE 6, the barge 10A is shown in a shallow area adjacent the shoreline wherein one set of caissons C9–C14 is elevated while the caissons C1–C8 support the barge 10A in a horizontal position, the caissons C1–C8 assuming various relative vertical positions with respect to the barge 10A so as to properly support the same. The jacking mechanism for each set of caissons may be operated from a suitable station (not shown) whereby the horizontal position of the barge can be maintained.

For purposes of brevity, the description of the walking barge 10A includes those structural arrangements which render the same operative for purposes described. However, many refinements to the basic construction here described will be evident to those skilled in the art. For example, the platforms may be compartmentalized for living purposes and the like, and the deck area will carry materials handling equipment and other structures found in marine barges of this character. Helicopter landing facilities may be provided as well as the usual small boat handling equipment so as to render the same habitable and seaworthy. The walking barge 10A lends itself to very large constructions. For example, the exterior dimensions of the upper platform 12 may be in the order of 300 feet by 500 feet with perhaps a 40-foot maximum walking stroke, $L_L$–$L_U$, provided between the upper platform 12 and the lower platform 14. Such a construction may support the barge 10A in perhaps 220 feet of water and 50 feet from the water level to the bottom surface of the barge 10A, while the upper platform 12 may have a maximum cross-sectional height of 40 feet. In such an arrangement, the caissons may assume a diameter of in the order of 20 feet. These dimensions are not intended to restrict the disclosure of the walking barge 10A but rather to afford a description of a typical size range contemplated by the instant invention.

Figure 7:
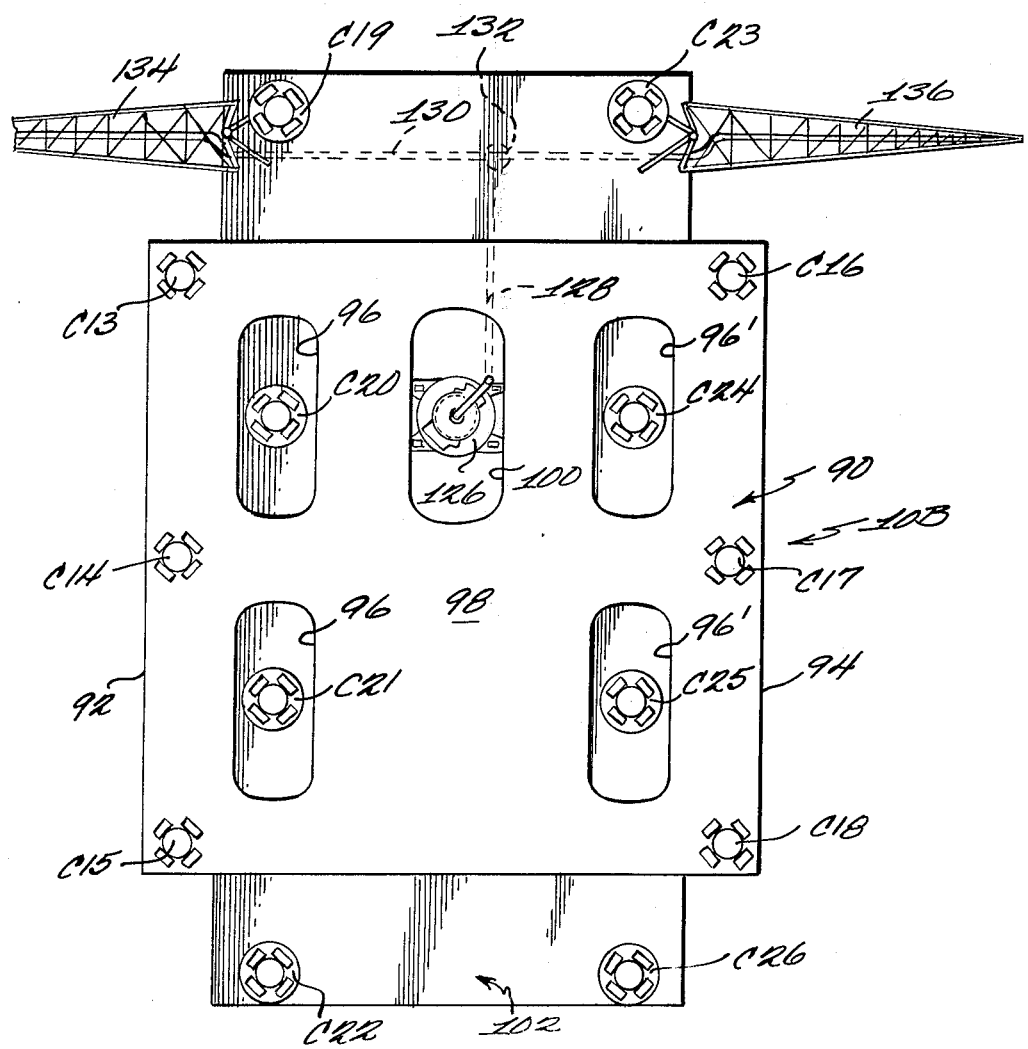
FIGURE 7 is a plan view of a modified walking barge construction according to another embodiment of this invention.
Figure 8:
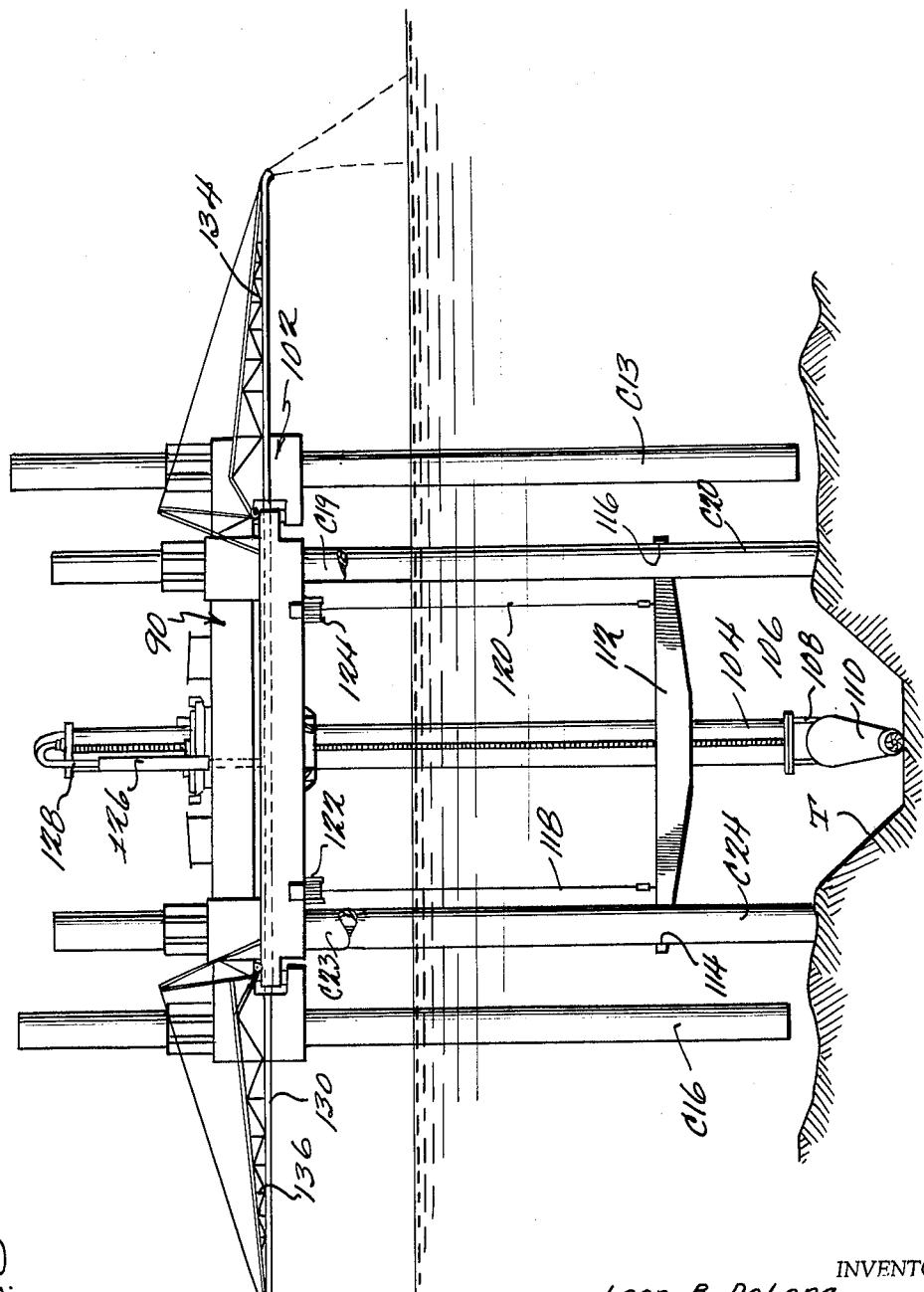
FIGURE 8 is a front end view of the walking barge in FIGURE 7.
Figure 9:
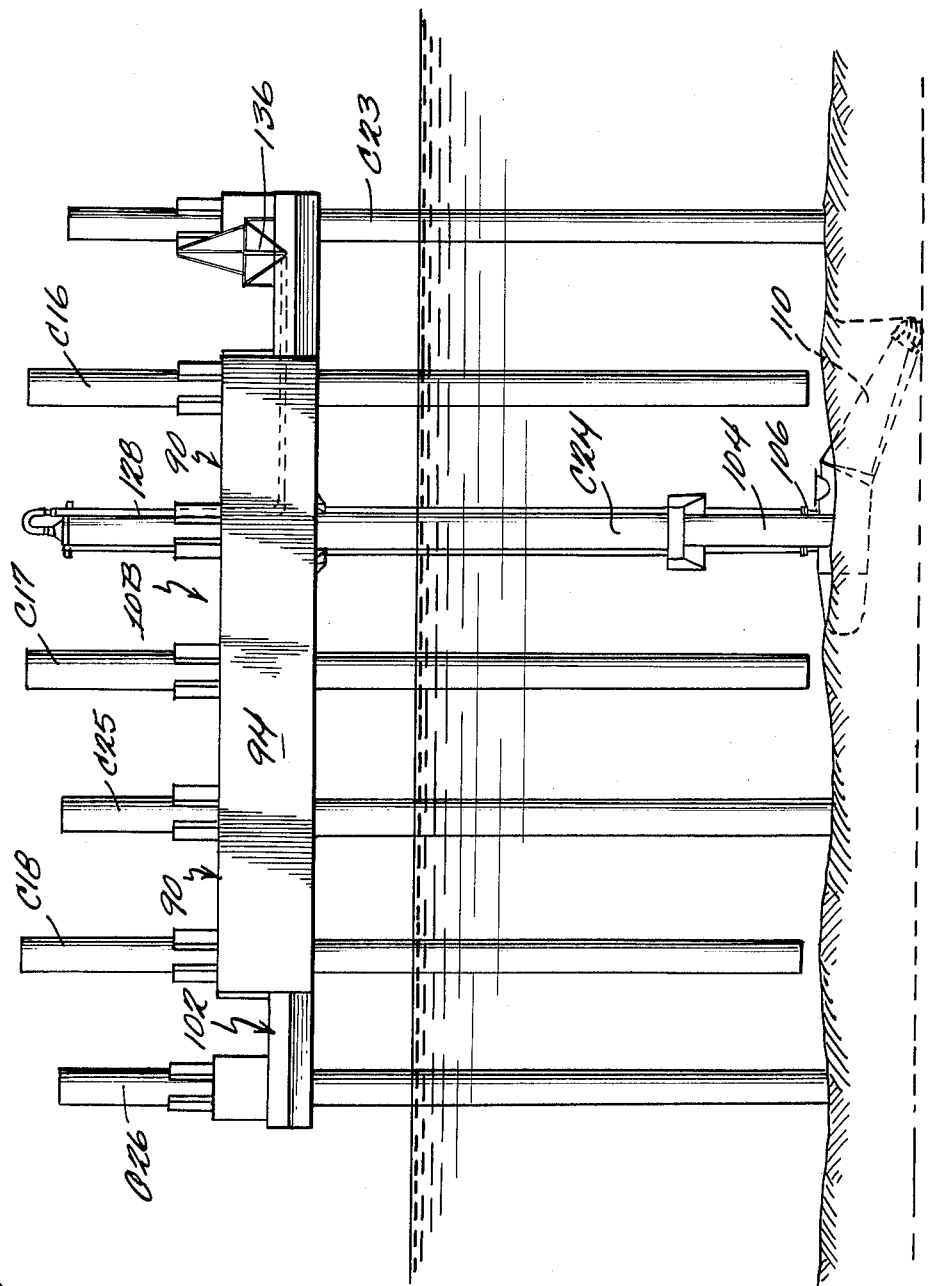
FIGURE 9 is a side elevational view of the walking barge in FIGURE 7.

The walking barge in FIGURES 7–9

Reference is now made to FIGURES 7–9 which show a modified walking barge 10B particularly designed for dredging operations. In this embodiment, the upper platform 90 is constructed in a manner generally similar to the upper platform in FIGURES 1–6, with depending side structures 92 and 94. However, no comparable end structures are provided in this embodiment of the invention.

The upper platform 90 has caissons C13–C15 along its one side structure 92 and caissons C16–C18 along its other side structure 94. The upper platform 90 has two longitudinal slots 96, 96' along the opposite sides of its central portion 98. The central portion 98 in this embodiment of the invention extends across the entire length of the upper platform 90 for reasons to become apparent. Also, the central portion 98 has a central slot 100 symmetrically disposed with respect to the longitudinal axis of the upper platform 90.

The lower platform 102 is of rectangular configuration and substantially longer than the upper platform 90 so that it projects beyond the front and rear ends of the upper platform 90. These two platforms 90 and 102 are connected for relative longitudinal movement by a tongue-and-groove arrangement of the type shown in FIGURE 2A. Hydraulic cylinders are provided for imparting relative longitudinal movemenmt to the two platforms 90, 102 in a manner shown in FIGURE 2B; and, hydraulic cylinders are provided for alignment purposes in a manner shown in FIGURE 2C.

The lower platform 102 carries caissons C19–C22 along its one side and caissons C23–C26 along its other side. The caissons C20 and C21 extend through the two slots 96 while the caissons C24 and C25 extend through the two slots 96'. Thus, the forwardmost caissons C19 and C23 extend beyond the front of the upper platform 90 while the rearwardmost caissons C22 and C26 are carried by the lower platform 102 rearwardly of the upper platform 90. Vertical movement of the set of caissons C13–C18 and the set of caissons C19–C26 is effected by separate jacking mechanisms in a manner identical to the arrangement disclosed in FIGURES 1–6. Thus, when the caissons C13–C18 are lowered to the marine ground to support the entire barge 10B above sea level, the inner caissons C19–C26 may be raised. Then, longitudinal movement between platforms 90 and 102 is obtained while the barge 10B is above sea level by actuation of the hydraulic cylinders shown in FIGURE 2A. The stroke or incremental lengths of movement of the platforms relative to one another is sufficiently small so that the extreme forward and rearward ends of the lower platform 102 are always open and unobstructed by the upper platform 90.

This barge construction in FIGURES 7–9 is adapted for sand dredging operations for forming pipe trenches and the like. To this end, there is provided a central dredging tube 104 extending upwardly through lower platform 102 and the central slot 100 of the upper platform 90. Suitable jacking mechanisms (not shown) of the type already described are operative to selectively raise and lower the dredging tube 104 in a manner identical to the caissons. The dredging tube 104 carries at its bottom by suitable flange connections 106 a hydraulic dredge capsule 108 having a downwardly inclined, forwardly extending cutting head 110.

In order to provide structural support for the depending dredging tube 104, a yoke 112 is carried for independent vertical movement by the dredging tube 104, the opposite extremities of the yoke 112 having vertical apertures 114 and 116 to provide a movable engagement with the inner caissons C20 and C24. In order to effect the vertical movement of the yoke 112, upwardly extending cables 118 and 120 are joined at their lower ends to the yoke and carried at their upper ends by suitable electric-motor driven winches 122 and 124, respectively, joined to the lower platform 102. By this arrangement the yoke 112 is vertically movable along the caissons C20 and C24 as well as independent of the dredging tube 104. However, by virtue of the flange connection 106 at the bottom of the dredging tube 104, the yoke 112 will not fall below this point should the cables 118, 120 ever be broken. Should these cables break, the jacking mechanisms (not shown) associated with the dredging tube 104 can raise both the dredging tube 104 and the yoke 112.

Mounted in communication with the upper end of the dredging tube 104 is a dredge pump 126 having a discharge line 128 connected to a transverse pipe 130 extending beyond opposite sides of the platform 102. For reasons to become apparent a directional valve 132 is interposed at this pipe connection. Opposed derricks 134 and 136 extend transversely of the sides of the lower platform 102. These derricks are vertically pivotable to their extending transverse positions and carry the opposite ends of the transverse pipe 130 to their outer extremities. By virtue of this arrangement, when the dredge capsule 108 is lowered for dredging a trench T in the marine ground, the silt and like material removed from the marine ground is conveyed upwardly through the dredging tube 104 to the dredging pump 126. The directional valve 132 is adjusted to direct this dredged material to a discharge point on one or the other of the derricks 134, 136, depending on the tide run of the water. Thus, with the upper platform 90 and the lower platform 102 raised above sea level, the barge may be walked while dredging operations are carried out to form a tunnel which is aligned with the axis of movement of the barge. After the dredging operations have been completed or the barge is to be initially towed to the dredging site, all the caissons C13–C26 are raised so that the barge 10B floats on the water and the dredging tube 104 as well as the yoke 112 are raised to their uppermost positions so as to minimize hydrodynamic resistance to movement in the water.

Figure 10:
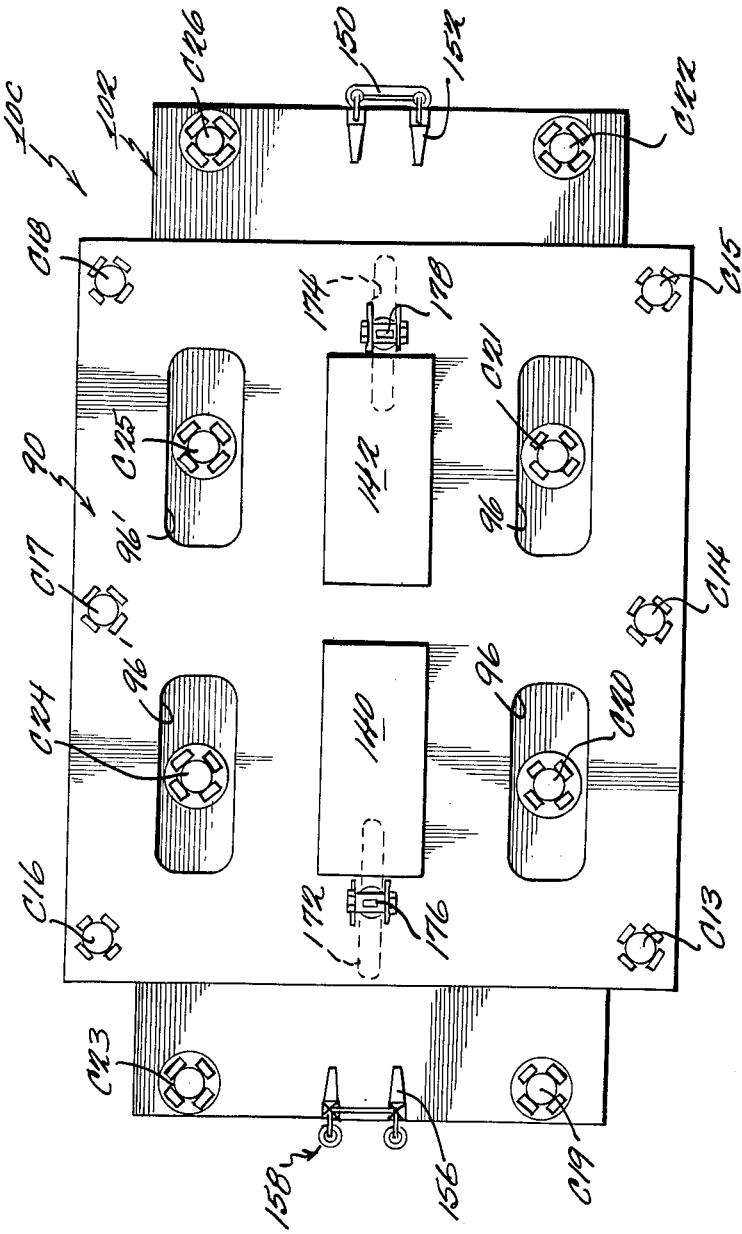
FIGURE 10 is a plan view of still another embodiment of the walking barge.
Figure 11:
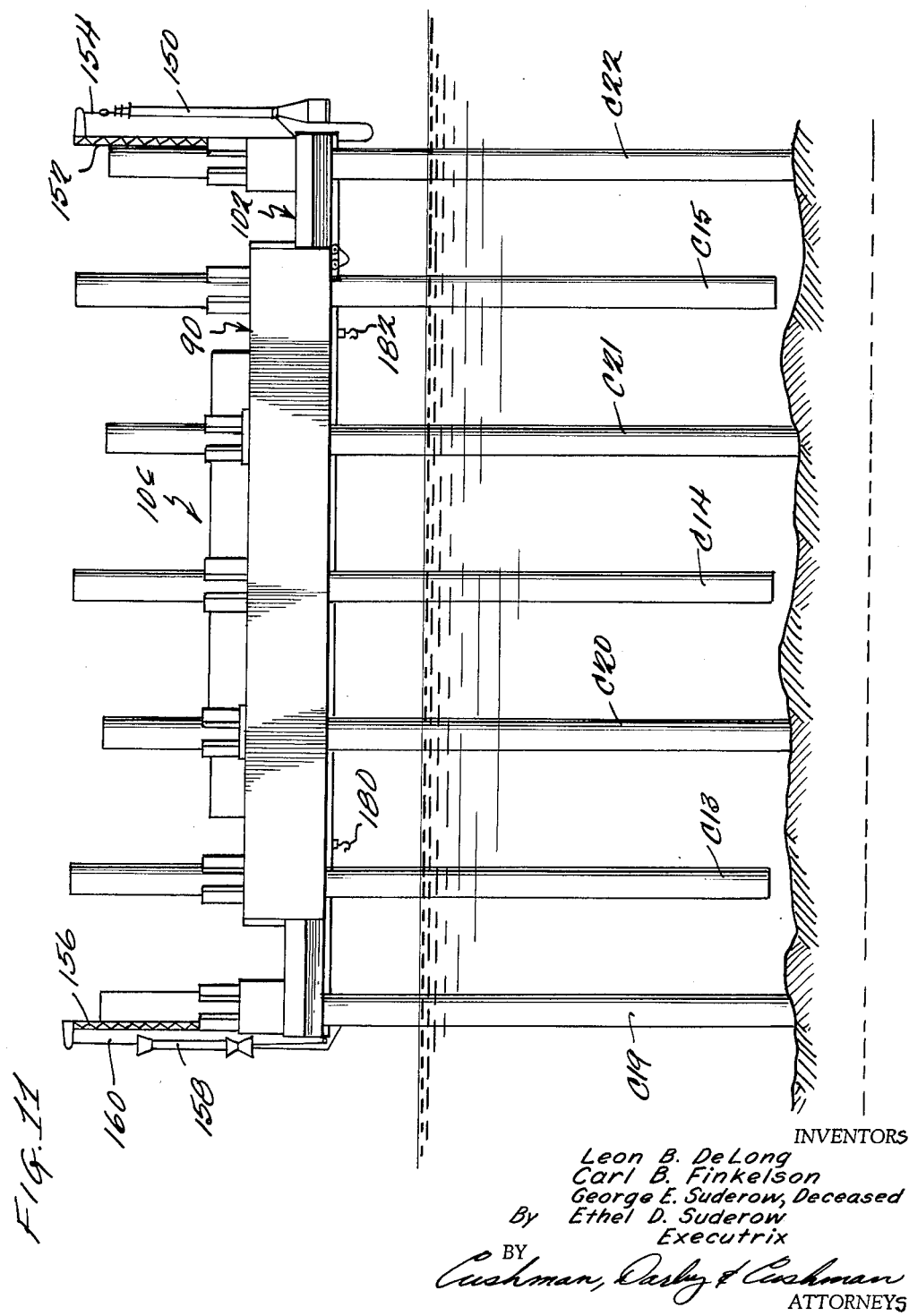
FIGURE 11 is a side elevational view of the walking barge in FIGURE 10.
Figure 12:
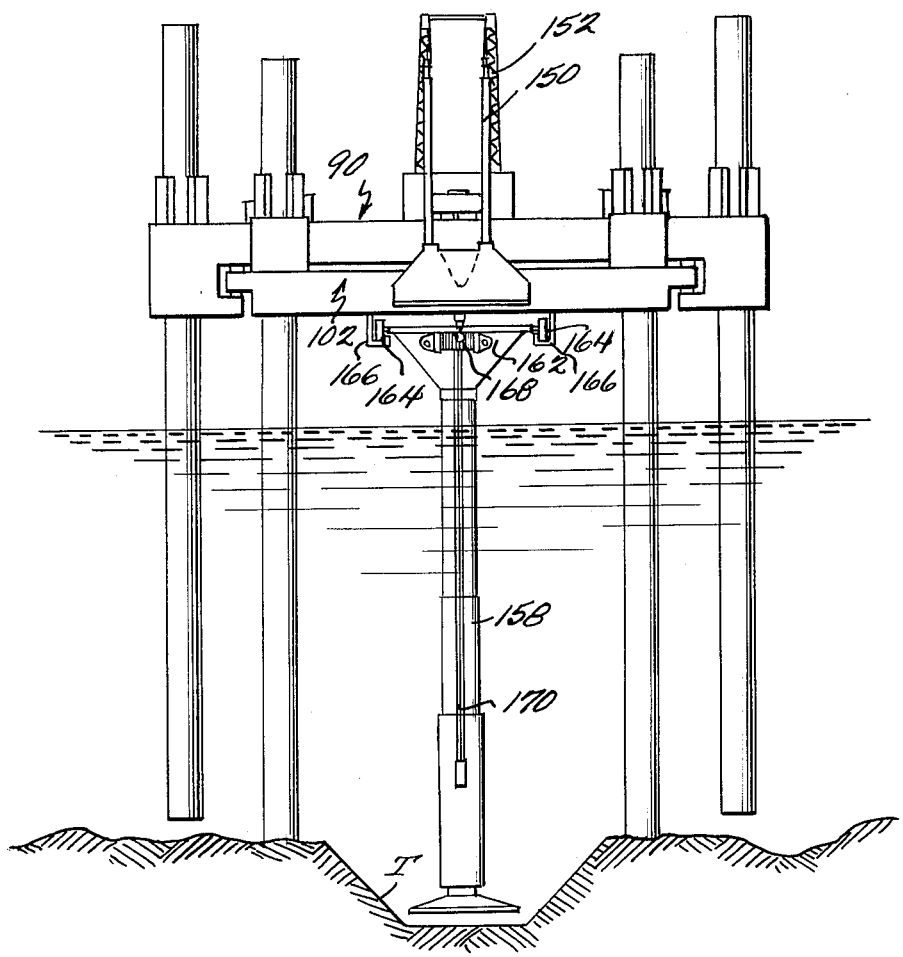
FIGURE 12 is a rear end view of the walking barge in FIGURE 10.

The walking barge in FIGURES 10–12

In FIGURES 10–12 still another walking barge 10C is shown, this barge is constructed in a manner identical to that shown in FIGURES 7–9 wherein like numerals refer to the same elements. However, this barge 10C is particularly designed for laying tunnel pipes and has gravel hoppers 140 and 142 disposed in longitudinally spaced fashion along the longitudinal axis of the barge 10C.

The rearward end of the lower platform 102 in this embodiment of the invention carries a screed 150. This screed is carried by a derrick 152 with appropriate cables 154 so that the same may be lowered to the marine ground. The details of the construction of the gravel screed 150 form no part of the instant invention except to note that the same operates in a conventional fashion to level a covering layer on pipe P which has been laid in a trench T.

The forward end of the lower platform 102 likewise carries an upright derrick 156, this derrick 156 carrying a gravel tremie 158 for vertical movement by cables 160.

The forward end of the lower platform 102 likewise carries an upright derrick 156, this derrick carrying a gravel tremie 158 by cables 160. The gravel tremie 158 takes the form of three telescoping pipes so that they may be lowered into the water a predetermined distance. Also, the tremie 158 has an enlarged funnel 162 at its upper end. This funnel 162 receives gravel from the hoppers 140 and 142. As will become evident, the gravel tremie 158 carries opposed rollers 164 which are aligned with spaced apart, longitudinally extending rails 166 carried along the underside of the lower platform 102. The gravel tremie 158 may thereby be lowered by the derrick cables 160 to an elevation coextensive with the forward ends of the rails 166 where it is then mounted by workmen positioned along appropriate platforms or the like (not shown) to effect this movement of the gravel tremie 158.

The funnel 162 also carries winches 168 having cables 170 joined thereto and connected at their lower ends to the bottommost of the telescoping pipes. Actuation of the winches 168 thereby allows the bottom of the gravel tremie 158 to be lowered and raised to and from the marine ground. Conventional means (not shown) allows the gravel tremie 158 to be moved back and forth along the rails 166 to pick up gravel from the hoppers and deposit the same in the trench T.

Likewise, the screed 158 carries spaced apart rollers 164 so that the screed 150 may be lowered by the derrick cables 154 and positioned by workmen on the rails 166.

In order to handle the tunnel pipe when the barge is elevated above water level, the lower platform has two central longitudinally spaced slots 172 and 174 with cable winches 176 and 178 mounted on the upper platform 90' centrally of each of the respective slots and communicating therewith. Depending cables 180 and 182 with appropriate gripping elements at their lower ends are operative to receive a tunnel pipe which has been floated between the caissons and for alignment purposes. One manner of handling the tunnel pipes with the cables 180 and 182 is to float a tunnel pipe, closed at its ends, with a buoyant tube joined to its upper end. The buoyant tube carrying the pipe at its underside is grasped by the cables 180 and 182 and the buoyant tube is then flooded so that the tube together with the tunnel pipe is lowered into the trench. Divers may then go underwater to release the tube from the pipes and the tube is then raised by the winches 176 and 178. The water is then expelled from the tube due to the fact the lower platform 102 is spaced above the water level and the tube is then closed so that it is again buoyant and is floated back to land where another tunnel pipe is connected thereto in any suitable manner.

Thus, the barge, when positioned above the water level, is operative to: (1) lay a foundation for the tunnel pipe with the gravel tremie; (2) position a tunnel pipe in the trench bed; and (3) cover the pipe with the screed. During these operations, the barge 10C is walked along the marine ground as previously described.

Figure 13:
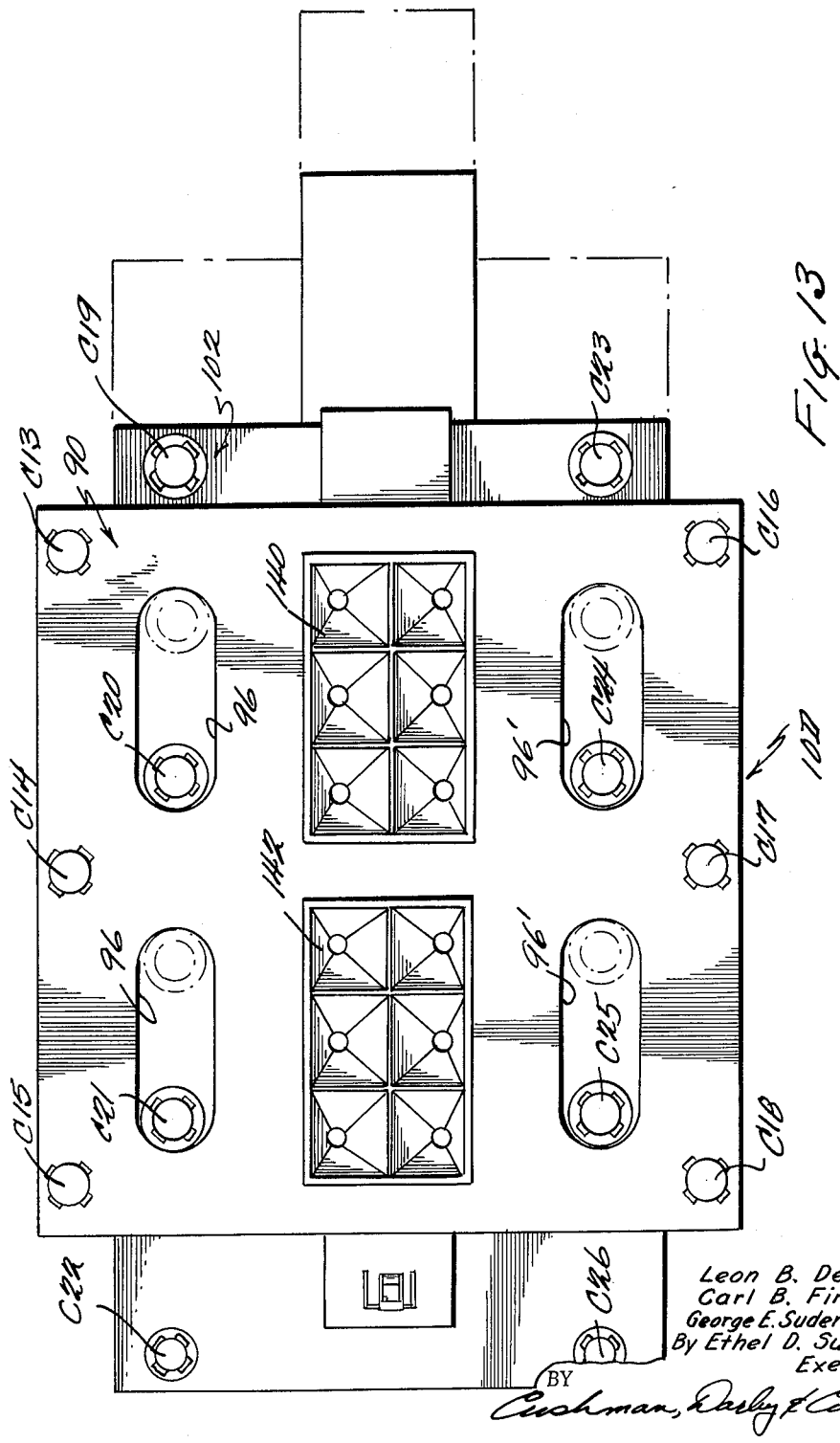
FIGURE 13 is a plan view of a walking barge according to another embodiment of this invention.
Figure 14:
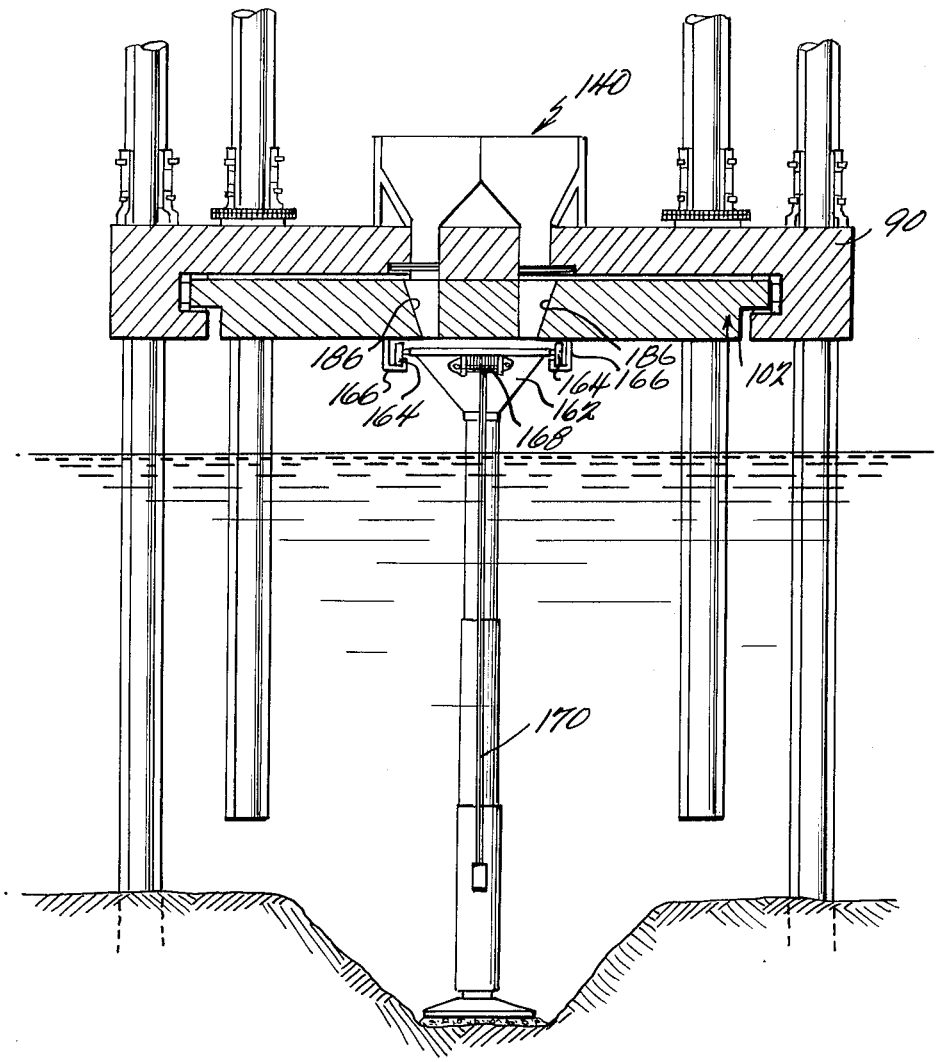
FIGURE 14 is a front elevational view of the walking barge in FIGURE 13.

*The walking barge in FIGURES 13-15*

FIGURES 13-15 show a walking barge 10D which is generally similar to that shown in FIGURES 10-12. There is no derrick to carry the screed, and the tremie funnel 162 receives gravel from the hoppers 140, 142 via chutes 186 in the lower platform 102 which, in this embodiment, are positioned in side-by-side relationship. When the gravel tremie 158 is not in use the telescoping pipes are simply raised by the cables 170 and the gravel tremie 158 is locked in place on the rails 166 for transportation purposes. As will be appreciated, suitable auxiliary equipment, conventional in itself, is provided to close and open the hopper chutes and to move the tremie 158 along the track. Safety devices (not shown) prevent the tremie 158 from inadvertently coming off the track 166, 168.

Further, the actual material carried in the hoppers 140, 142 may vary according to the requirements of the particular construction job, the composition of the marine ground, and the like.

*The walking barge in FIGURES 16-17*

In FIGURES 16 and 17, a walking barge 10E is shown which is constructed in a manner generally similar to the other embodiments of this invention. However, this barge construction is operative to be walked in perpendicular directions. There is provided a central platform 200 which is of rectangular configuration. This platform 200 has horizontally extending supporting members 202 at its forward and rearward ends, two such members being shown in FIGURE 16 at the rearward end. The opposed sides of the central platform 200 likewise have horizontally extending supporting members 204, there being shown two in FIGURE 16, although the number of such elements depends on the particular design conditions. A pair of generally rectangular auxiliary platform members 206 are positioned adjacent the front and rear ends of the central platform 200, the platform members 206 having longitudinally extending transverse slots 208 which are of substantially greater length than the corresponding dimension of the supporting members 202.

The supporting members 202 are carried within these slots 206 by pairs of roller bearings 210, positioned in inclined relationship above and below the supporting members 202 so as to prevent movement of the supporting members 202 out of the slots 208. This arrangement of roller bearings 210 allows the auxiliary platform members 206 to move transversely with respect to the supporting members 202, i.e., parallel to the adjacent edge of the central platform 200. The other sets of supporting members 204 are carried within corresponding slots 214 in corresponding auxiliary platform members 212. An identical roller bearing arrangement (not shown) is provided to limit the movement of the auxiliary platform members 212 to parallel relative movement with respect to the adjacent edge of the central platform 200.

The auxiliary platform members 206 each carry a set of two spaced-apart caissons C27 and C28 vertically movable by jacking mechanisms 216, as previously described. Likewise, the auxiliary platform members 212 each carry a set of spaced-apart caissons C29 and C30 operative for vertical movement with respect to the barge 10E by jacking mechanisms 216. Either of the caisson sets C27, C28 and C29, C30 is operative to stably support the barge 10E on the marine ground independently of the other set.

In order to effect relative movement between the central platform 200 and the two pairs of auxiliary platform members 206 and 212, a hydraulic jacking arrangement is provided. To this end, a hydraulic piston and cylinder 220 is positioned adjacent each edge of the central platform 200 nearest the first pair of auxiliary platform members 206. The piston rod 222 of each hydraulic cylinders is connected to its adjacent auxiliary platform member 206 via a suitable bracket connection 224. Thus, when the caissons C27 and C28 are raised, it is evident that relative movement may be provided between the central platform 200 and the auxiliary platforms 206 by suitable actuation of these hydraulic cylinders 220. In a like manner, hydraulic cylinders 226 are positioned along the opposite edges of the central platform 200 adjacent the second pair of auxiliary platforms 212, their piston rods 228 being connected to these auxiliary platform members 212 via a suitable bracket connection 230. When the caissons C29 and C30 are raised and the barge 10E is supported by the caissons C27 and C28, there may be provided a relative movement between the auxiliary platform members 212 and central platform 200. It will be appreciated, however, that this arrangement of hydraulic cylinders may be positioned below the deck of the central platform 200, as desired.

The operation of the walking barge 10E is as follows: after the barge 10E has been floated to the work site with all the caissons C27–C30 elevated, the caissons C27–C30 are lowered to the marine ground at the working site and the jacking mechanisms 216 and 218 are actuated to elevate the barge 10E above the water level. When it is desired to walk the barge in one direction, designated by arrow A, the caissons C27 and C28 are elevated so that the barge 10E is supported on the marine ground solely by the caissons C29 and C30. The hydraulic cylinders 226 are then actuated to move the central platform 200 horizontally relative to auxiliary platform members 212. Thus, the supporting members 204 are moved to one end of the slots 214. The set of caissons C27 and C28 are lowered; the set of caissons C29 and C30 are then raised, and the hydraulic cylinders 226 are actuated in their opposite directions to move the auxiliary platform members 212 relative to the central platform 200, the supporting members 204 thereby being positioned to the other end of the longitudinal slots 214. The set of caissons C29, C30 are then lowered and the set of caissons C27, C28 raised. The hydraulic cylinders 226 are then actuated to repeat the operation. In this manner, the barge 10E can be walked in the direction shown by the arrow A, or in the opposite direction, as is evident. When the barge is to be walked in the direction A', which is perpendicular to the axis A, the same procedure takes place with the hydraulic cylinders 220 being utilized instead of the hydraulic cylinders 226.

From the foregoing description of the various embodiments of this invention, it is evident that the objects of this invention, together with many practical advantages are successfully achieved. While preferred embodiments of our invention have been described, numerous further modifications may be made without departing from the scope of this invention.

Therefore, it is to be understood that all matters herein set forth or shown in the accompanying drawings are to be interpreted in an illustrative and not in a limiting sense.

What is claimed is:

1. A marine walking barge comprising:
   (a) first and second platform means joined to one another for relative linear horizontal movement and against relative vertical movement therebetween, one of said platform means including a deck surface over its major area to accommodate workmen and equipment thereon, said first and second platform means constituting a buoyant unitary structure;
   (b) first and second sets of legs mounted to said first and second platform means, respectively, for vertical movement relative thereto, the legs of each set being horizontally spaced and arranged so as to be capable of stably supporting said structure on a marine ground independently of the other set and so as to permit said relative horizontal movement without interference between said sets of legs, one of said platform means including horizontally elongated slots extending vertically through said one platform means and aligned with the direction of said horizontal movement, certain of the legs of the set carried by the other platform means each projecting through one of said slots so that the latter defines the maximum extent of relative movement between said first and second platform means and limit the same so that at said relative maximum extent either of said leg sets can stably support said structure;
   (c) jacking means associated with each leg set and with the corresponding platform means to selectively effect or restrain vertical movement of the legs of each set in either direction relative to the corresponding platform means in order to raise or lower said structure on a leg set when the latter is engaged with the marine ground and raise or lower a leg set when said structure is afloat or supported on the other leg set, whereby said structure may be selectively supported by either one of said leg sets;
   (d) and means engageable with both said platform means for moving the same relative to one another horizontally in said direction when one leg set supports said structure above water and the other leg set is elevated from the marine ground, whereby said barge can be floated to a working site with said leg sets elevated, raised above water and supported on at least one leg set, and then can be moved with a step by step movement horizontally in said direction by supporting said structure alternately on said leg sets and moving the platform means, the leg sets of which are elevated, relative to the other platform means.

2. A marine walking barge defined in claim 1 wherein said platform moving means includes hydraulic piston and cylinder means interconnecting said two platform means, the axis of said hydraulic piston and cylinder means being aligned with said direction of movement.

3. Marine walking barge defined in claim 1 wherein said first platform means constitutes an upper platform and said second platform means constitutes a lower platform, and a tongue-and-groove joint between said upper and lower platform means along the sides thereof to provide said relative movement.

4. Marine walking barge defined in claim 3 wherein said lower platform means is substantially longer than said upper platform means, said elongated slots being of a length sufficiently small to prevent said upper platform from moving over the end extremities of said lower platform.

5. Marine walking barge defined in claim 3 wherein said upper platform means is substantially longer than said lower platform means.

6. Marine walking barge defined in claim 5 wherein said upper platform means includes a centrally recessed portion receiving said lower platform means, the length of said lower platform means being less than the length of said central portion to allow relative movement therebetween.

7. Marine walking barge defined in claim 3 including means for aligning said platform means relative to one another for longitudinal movement.

8. Marine walking barge defined in claim 7 wherein said aligning means includes hydraulic cylinders positioned in transverse relationship to said tongue-and-groove joint whereby expansion or retraction thereof aligns said lower platform means with respect to said upper platform means.

9. Marine walking barge defined in claim 1 including a yoke operatively mounted to certain of the legs of one of said sets beneath the platform means and means for effecting vertical movement of said yoke.

10. Marine walking barge defined in claim 9 including a pipe operative for vertical movement relative to said platform means and operatively joined to said yoke whereby said yoke stabilizes said pipe when the pipe extends downwardly into the water.

11. Marine walking barge defined in claim 10 including dredging means operatively connected to said pipe, said pipe being constructed and arranged to convey material and the like dredged from the marine ground to a point remote therefrom.

12. Marine walking barge defined in claim 3 including track means positioned along the underside of said lower platform.

13. Marine walking barge defined in claim 12 including a telescoping pipe structure; roller means for mounting said telescoping pipe structure to said track means; cable means joined to the lowermost pipe of said telescoping pipe structure for raising and lowering said telescoping pipe structure relative to one another.

14. Marine walking barge defined in claim 13 including hopper means carried by said upper platform; funnel means carried by the upper end of said telescoping pipe structure; and means for conveying material from said hopper means to said telescoping pipe structure via said funnel means.

15. Marine walking barge defined in claim 14 wherein said telescoping pipe structure constitutes a gravel tremie.

16. Marine walking barge defined in claim 14 wherein said telescoping pipe structure includes a pair of spaced apart telescoping pipes, and gravel screed means carried at their lower end.

References Cited by the Examiner
UNITED STATES PATENTS

| | | | |
|---|---|---|---|
| 968,975 | 8/1910 | Piercy | 61—46 |
| 1,128,039 | 2/1915 | Piercy | 61—46 |
| 1,792,065 | 2/1931 | Bowers | 37—73 |
| 1,946,389 | 2/1934 | Christiansen | 61—72.3 |
| 2,910,835 | 11/1959 | Timothy | 61—72.3 |
| 2,997,852 | 8/1961 | Suderow | 61—46.5 |
| 3,033,525 | 5/1962 | Johnson | 61—46.5 X |
| 3,086,305 | 4/1963 | West | 37—73 |
| 3,107,496 | 10/1963 | Suderow | 61—46.5 |

JACOB SHAPIRO, EARL J. WITMER, *Examiners.*

CHARLES E. O'CONNELL, *Primary Examiner.*